July 28, 1925.  1,547,347

M. RADAKOVICH

MOUSETRAP

Filed March 12, 1925

Inventor
Michael Radakovich.
By Adam E. Fisher.
Attorney

Patented July 28, 1925.

1,547,347

UNITED STATES PATENT OFFICE.

MICHAEL RADAKOVICH, OF CUDAHY, WISCONSIN.

MOUSETRAP.

Application filed March 12, 1925. Serial No. 14,912.

*To all whom it may concern:*

Be it known that MICHAEL RADAKOVICH, a citizen of the United States, residing at Cudahy, in the county of Milwaukee and State of Wisconsin, has invented certain new and useful Improvements in Mousetraps, of which the following is a specification.

This invention is a mouse trap, and the main object is to provide a trap in a form the least calculated to arouse the suspicion of the mouse approaching it.

Another object is to provide a trap having a bait trigger set in a run-way standing apparently free of any suspicion exciting elements.

In the drawing

Figure 1:
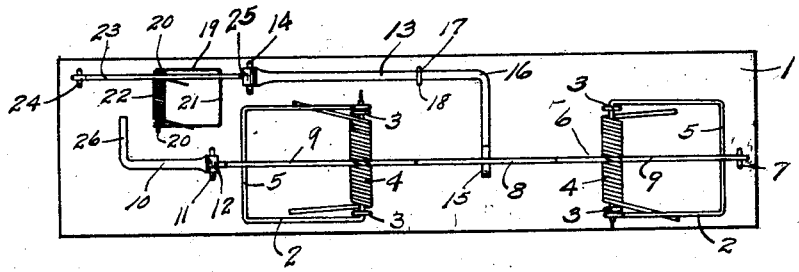
Figure 1 is a plan view of the trap when set.
Figure 2:
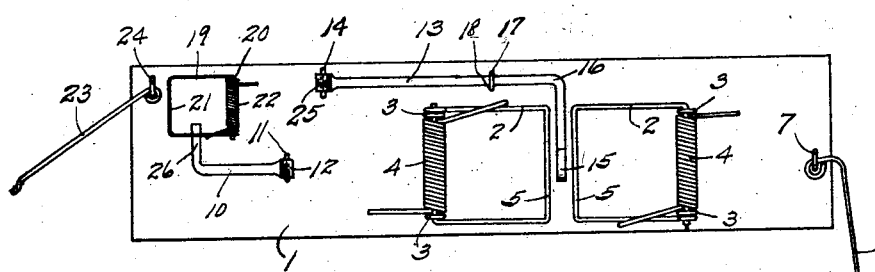
Figure 2 is a plan view of the trap when sprung.
Figure 3:
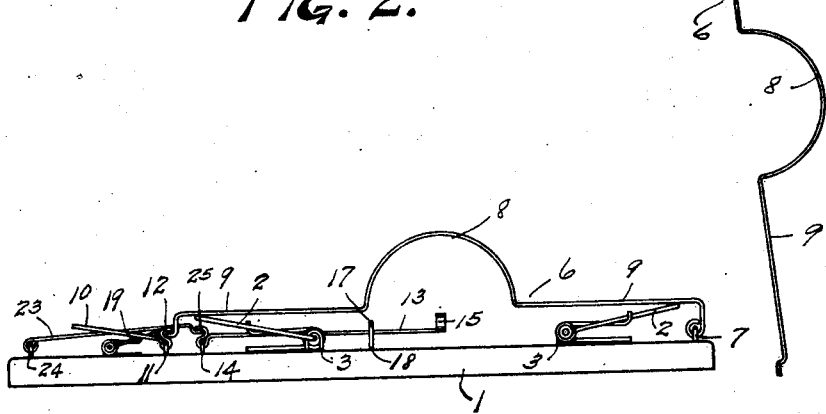
Figure 3 is a side view of the trap when set.

The invention includes an elongated base 1, of wood or other suitable material, upon the middle portion of which are mounted two spring set jaws 2, the same being anchored at 3 to the top side of the base and being normally forced or pressed down upon the base through the action of the coil springs 4. These jaws are set oppositely to each other with the springs 4 extended transversely upon the base and so that the free ends 5 of the jaws will fall quite close together upon the base when the trap is sprung. A wire jaw holder 6 is loosely linked by one end to a staple 7 set in an end of the base 1. This jaw holder is arched medially as shown at 8, while the end portions 9 serve to bear upon the jaws 2 when the same are in set position and hold same in such position. A trigger 10 is hinged at 11 to the opposite end of the base 1 and is provided with a catch 12 adapted to engage the free end of the jaw holder 6 when the same is pressed down upon the set jaws 2. A bait arm 13 is hinged at 14 at one side of the trigger 10 and its free end is extended longitudinally of the base 1 and towards the central portion thereof. A wire bait hook 15 extends from the arm 13 and is bent angularly inwardly at the point 16 and extended in between the free ends of the two jaws 2, so that these jaws when sprung just clear the said hook 15. A wire guide loop 17 encircles the bait arm and is secured in the base at the point 18. This loop serves to keep the arm 13 and hook 15 properly centered. Immediately at the side of the trigger 10 is mounted a small setting spring 19 anchored at 20 to the base 1, the same consisting of a wire loop 21 normally thrown close to the base by a coil spring 22 in a manner similar to the jaws 2. A wire set-spring holder 23 is linked at 24 to the end of the base 1, and the end of this holder is adapted to engage a catch 25 mounted at the hinged end of the bait arm 13. A trip pin 26 extends from the side of the trigger 10 and under the setting spring loop 21 as means for facilitating the setting of the trap, and also to serve as a trip for depressing the trigger 10 and thus springing the trap.

This trap is set by turning the jaws 2 outwardly from each other and down upon the base 1, pressing the holder 6 down upon the jaws 2, and passing the end of the holder under the catch 12 of the trigger 10, the free end of the latter being elevated to throw the catch forwardly. Bait is placed upon the bait hook 15, the bait arm 13 is elevated, the setting spring 19 is pressed over towards the bait arm and down upon the base 1 where it is held by the holder 23, the end of which is passed under the catch 25 of the bait arm 13. Thus the trap is completely set. A mouse stepping upon the base 1 and disturbing bait on the hook 15 releases the setting spring 19, whereupon the loop 21 flies over and strikes the trip pin 26 which depresses the trigger 10, and the jaws 2 are released and fly over from each side and strike the animal and press and hold him securely to the base 1.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. A mouse trap, comprising a base; two spring set jaws oppositely positioned upon the base and so that their free ends will close adjacent to each other; a jaw holder linked by one end to the base and adapted to bear upon the jaws and hold them in set position, the said jaw holder having an arched medial portion; a trigger mounted upon the base oppositely to the jaw holder and adapted to engage the free end of the jaw holder, the said trigger having a trip pin extended laterally therefrom; a bait arm and extended bait hook hingedly secured to the base with the hook disposed between the free ends of the two trap jaws, the said bait arm having a catch at its hinged end; a looped setting spring mounted upon the base at the hinged end of the bait arm and adapted to engage the said trip pin of the trigger; and a set spring holder linked to the base and adapted to hold down the said looped setting spring, the end of the holder being adapted to engage the catch at the end of the bait arm.

2. A trap of the kind described, comprising an elongated base; spring set trap jaws oppositely secured to the base; a bait hook hinged to the base and adapted for positioning between the ends of the trap jaws; a jaw holder linked to the base and adapted to pass over the jaws; a trigger for engaging the free end of the jaw holder; a trip pin extended laterally from the trigger; a setting spring adjacent the hinged end of the bait hook, the said setting spring having a loop adapted to impinge the said trip pin of the trigger; and a holder for the setting spring, the same being linked at one end to the base and the free end being adapted to engage the hinged end of the bait hook.

In testimony whereof I affix my signature.

MICHAEL RADAKOVICH.

Witnesses:
T. LUTINENA BRKELY.
ANNA BZDUSEK.